United States Patent [19]

Takahashi et al.

[11] Patent Number: 5,522,485

[45] Date of Patent: Jun. 4, 1996

[54] ROTARY DAMPER

[75] Inventors: Norio Takahashi, Yokohama; Kazuyoshi Koizumi, Sagamihara, both of Japan

[73] Assignee: Nifco Inc., Yokohama, Japan

[21] Appl. No.: 57,466

[22] Filed: May 6, 1993

[30] Foreign Application Priority Data

May 8, 1992 [JP] Japan .................................. 4-141992

[51] Int. Cl.[6] .................................................. F16D 57/02
[52] U.S. Cl. .................................. 188/306; 188/290
[58] Field of Search .................................. 188/306–310, 188/296, 290, 322.5, 322.16, 322.17; 16/51–53, 54, 57; 384/130, 153

[56] References Cited

U.S. PATENT DOCUMENTS

| | | | |
|---|---|---|---|
| 1,189,829 | 7/1916 | Setter et al. | 188/322.16 X |
| 2,476,324 | 7/1949 | Reich | 188/322.17 X |
| 4,550,470 | 11/1985 | Omata | 188/290 X |
| 4,565,266 | 1/1986 | Omata | 188/290 X |
| 4,576,252 | 3/1986 | Omata | 188/290 X |
| 4,697,673 | 10/1987 | Omata | 16/52 X |
| 4,796,733 | 1/1989 | Nakayama | 188/290 X |
| 4,838,839 | 6/1989 | Watanabe et al. | 188/322.5 X |
| 4,938,322 | 7/1990 | Sugasawara et al. | 16/51 X |

FOREIGN PATENT DOCUMENTS

| | | | |
|---|---|---|---|
| 3603703 | 8/1986 | Germany | 188/296 |
| 3726031 | 2/1988 | Germany . | |
| 4119090 | 12/1991 | Germany . | |
| 61-136358 | 8/1986 | Japan . | |
| 320337 | 12/1989 | Japan | 188/296 |
| 680851 | 10/1952 | United Kingdom . | |
| 1587771 | 4/1981 | United Kingdom . | |
| 2263526 | 7/1993 | United Kingdom . | |

*Primary Examiner*—Robert J. Oberleitner
*Assistant Examiner*—Chris Schwartz
*Attorney, Agent, or Firm*—Oblon, Spivak, McClelland, Maier & Neustadt

[57] ABSTRACT

A rotary damper includes a rotor having a shaft, a housing having an opening and forming therein a chamber for accommodating the rotor so that the rotor is rotatable while being damped, and a cap for closing the opening of the housing. The housing has an annular wall which is provided on the outer periphery thereof with a gear portion. The shaft of the rotor projects out of the cap.

14 Claims, 3 Drawing Sheets

ROTARY DAMPER

BACKGROUND OF THE INVENTION

1. Field of the Invention

This invention relates to a rotary damper for use with a rotating or sliding member such as the lid of an audio or video tape recorder, a computer floppy disk drive, a glove compartment or an ashtray in an automobile or other such device, and which damps rotating or sliding movement of the member.

2. Description of the Prior Art

A typical conventional rotary damper of this type comprises a housing having a chamber filled with a viscous fluid, a cap for covering the housing, a rotor shaft rotatably extending upright from the chamber of the housing and projecting outward from the cap for shearing the viscous fluid by its rotation, and a gear for connecting the rotor shaft and the lid etc. of such a device as mentioned above. In the conventional rotary damper, since the viscous fluid is sheared by the rotation of the rotor shaft, the viscosity of the viscous fluid damps the rotor shaft and consequently the lid etc. of the device via the gear. However, since the conventional rotary damper has a thickness corresponding to the total of the thickness of the housing covered by the cap and the thickness of the gear, it is not suitable for use with such a device as an audio or video tape recorder which is desired to be compact.

As a solution of this problem, Japanese Utility Model Public Disclosure No. 61-136358 proposes a rotary damper of the type wherein a pair of elastic bosses are formed on the body of a device, a gear is inserted under friction on the bosses, and a rack extending from a lid rotatably mounted on the device body is engaged with the gear. This prior art rotary damper, however, can neither maintain a uniform damping force because the damping force relies on the friction resistance between the bosses and the gear nor provide a long service life because the wear at the interface of the bosses and the gear is large.

SUMMARY OF THE INVENTION

An object of this invention is to provide a compact and thin rotary damper easy to fix to a device with high reliability and enabling production of a desired damping force.

To attain the above object, this invention provides a rotary damper comprising a rotor having a shaft, a housing having an opening and an annular wall which is provided on an outer periphery thereof with a gear portion and forming therein a chamber for accommodating the rotor so that the rotor is rotatable while being damped, and a cap for closing the opening of the housing, the shaft of the rotor projecting out of the cap.

The above and other objects, features and advantages of this invention will become more apparent to those skilled in the art from the description given hereinbelow with reference to the accompanying drawings.

BRIEF DESCRIPTION OF THE DRAWINGS

FIG. 1b is a cross section taken along line Ib—Ib in FIG. 1a.

FIG. 2b is a cross section taken along line IIb—IIb in FIG. 2a.

FIG. 3b is a cross section taken along line IIIb—IIIb in FIG. 3a.

DESCRIPTION OF THE PREFERRED EMBODIMENTS

Figure 1A:
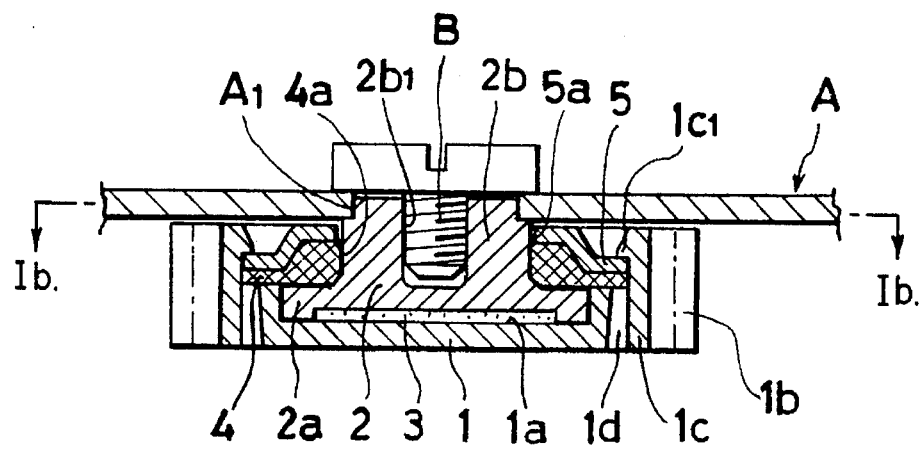
FIG. 1a is a cross section showing one embodiment of the rotary damper according to this invention.

This invention will now be described in detail with reference to the illustrated embodiments. In any of the embodiments, reference numeral 1 designates a housing which forms therein a chamber 1a containing a viscous fluid 3 such as grease or oil and which has an annular wall 1c provided on the open side of the housing 1 with four engaging claws $1c_1$ arranged at 90° spacing and a gear portion 1b formed on the outer periphery of the annular wall 1c. Denoted by 1d is a cavity for the formation of the annular wall 1c in molding the housing 1. Numeral 2 denotes a rotor having a disklike portion 2a accommodated in the chamber 1a of the housing 1 containing the viscous fluid 3 and a shaft portion 2b having a non-circular end. Numeral 4 designates a sealing member formed of silicone rubber in the shape of a disk, disposed on the open side of the housing for preventing the viscous fluid 3 from leaking out and provided at the center thereof with a hole 4a through which the shaft portion 2b of the rotor 2 is snugly passed. Numeral 5 designates a cap disposed on the sealing member 4, fixed to the housing 1 by the engaging claws $1c_1$ of the annular wall 1c and provided at the center thereof with a hole 5a through which the shaft portion 2b of the rotor 2 is passed.

The rotary damper of this invention is fabricated by introducing the viscous fluid 3 and the disklike portion 2a of the rotor 2 into the chamber 1a of the housing 1, inserting the sealing member 4 on the shaft portion 2b via the hole 4a, inserting the cap 5 on the shaft portion 2b via the hole 5a, and pushing the cap 5 toward the sealing member 4 utilizing the resiliency of the annular wall 1c of the housing 1, thereby causing the cap 5 to ride over the engaging claws $1c_1$ to obtain engagement between the engaging claws $1_{c1}$ and the cap 5. Thus, the cap 5 is fixed to the open side of the housing 1, with the shaft portion 2b of the rotor 2 projecting upward from the cap 5.

Figure 1B:
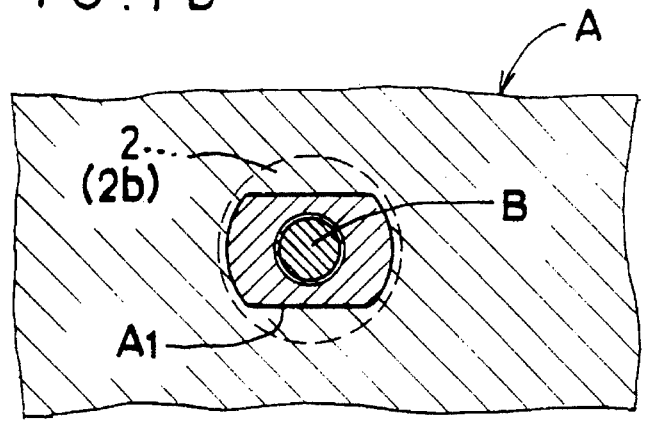

In the embodiment shown in FIG. 1a and FIG. 1b, the rotary damper of this invention is fixed to a device A by inserting the non-circular end of the shaft portion 2b of the rotor 2 into a complementary hole $A_1$ formed in the device A and driving a screw B into a screw hole $2b_1$ formed in the shaft portion 2b.

Figure 2A:
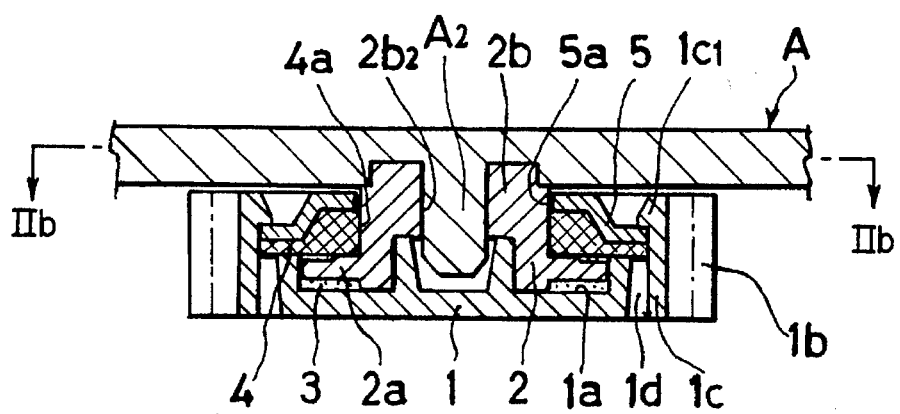
FIG. 2a is a cross section showing another embodiment of the rotary damper according to this invention.
Figure 2B:
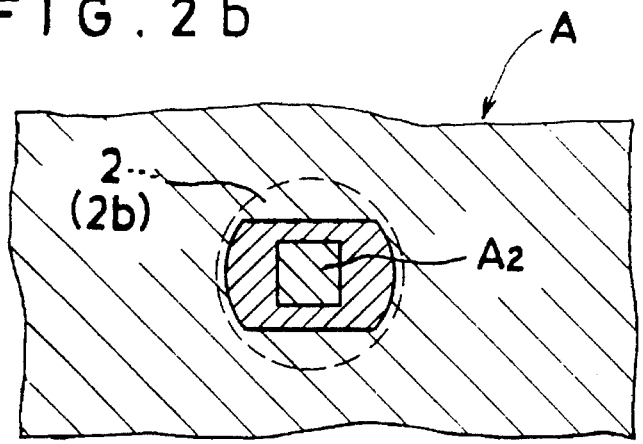

The rotary damper shown in FIG. 2a and FIG. 2b, is fixed to a device A by fitting a non-circular protuberance or boss $A_2$ of the device A into a complementary fitting hole $2b_2$ formed in the shaft portion 2b of the rotor 2 and fixing the protuberance or boss $A_2$ therein with adhesive or by some other fixing means.

Figure 3A:
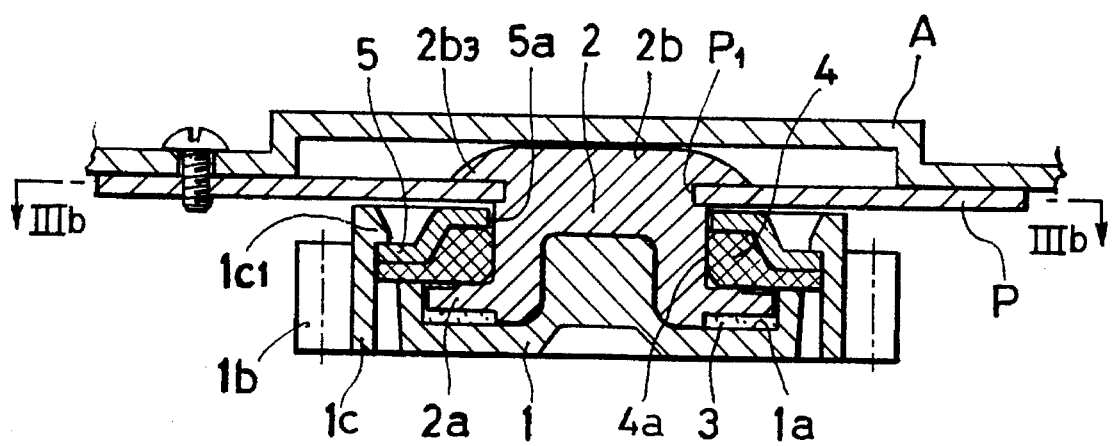
FIG. 3a is a cross section showing still another embodiment of the rotary damper according to this invention.
Figure 3B:
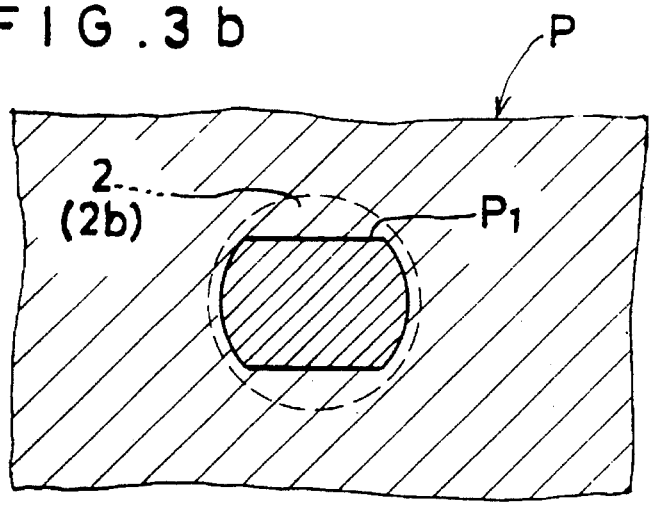

In the embodiment shown in FIG. 3a and FIG. 3b, the rotary damper is fixed to a device A through a fitting plate P having a non-circular hole $P_1$ by forming the shaft portion 2b to be longer than that shown in FIG. 1a and FIG. 1b, inserting the non-circular end of the shaft portion 2b into the non-circular hole $P_1$ to cause the shaft portion $2b$ to project upward from the fitting plate P, fusing or caulking the projecting part of the shaft portion $2b$ to form a bulged portion $2b_3$, and fixing the fitting plate P having the rotary damper fitted thereto to the device A by means of bolts, screws or some other fixing means.

The rotary damper is thus fixed to a device A directly or indirectly utilizing its rotor 2.

Figure 4:
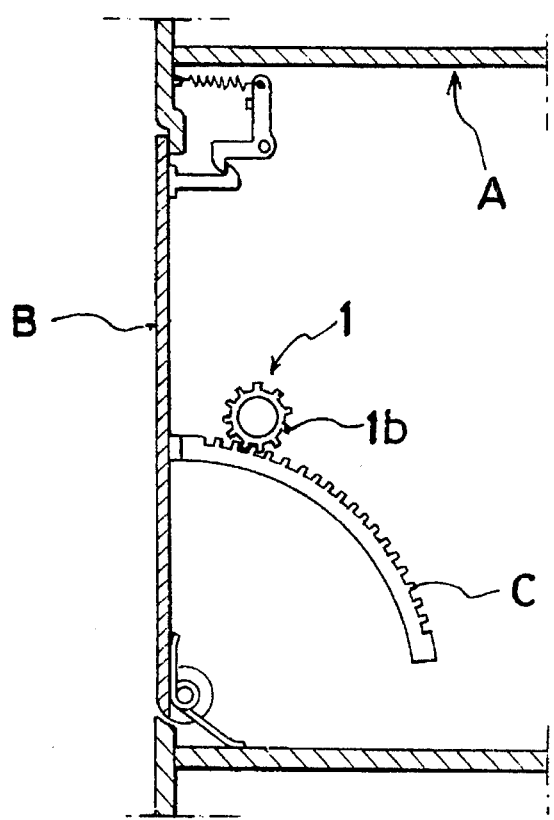
FIG. 4 is an explanatory view showing one application of the rotary damper according to this invention.

As shown in FIG. 4, for example, by causing the gear portion $1b$ formed on the outer periphery of the annular wall $1c$ of the housing 1 to mesh with a rack C integral with a lid B rotatably mounted on a device A, the lid B is damped during its opening and closing operation.

Figure 5:
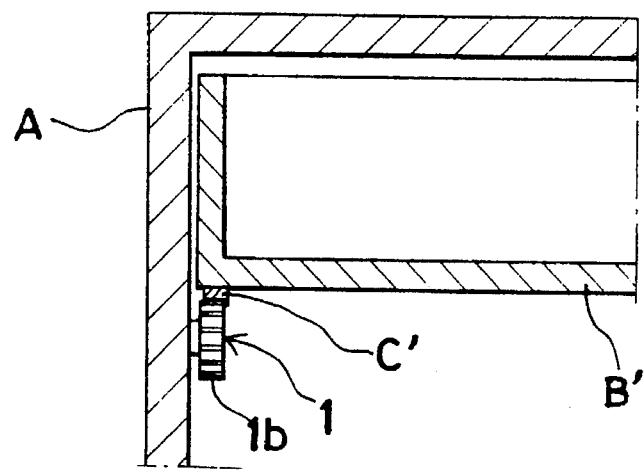
FIG. 5 is an explanatory view showing another application of the rotary damper according to this invention.

As shown in FIG. 5, by causing the gear portion $1b$ formed on the outer periphery of the annular wall $1c$ of the housing 1 to mesh with a rack C' integral with a drawer B' mounted on a device A so that the drawer can be linearly inserted into and drawn out of the device A, the drawer B' is damped in its inserting and drawing-out operation.

Since the rotor 2 is fixed to the device A, the housing 1 having the gear portion $1b$ formed on the outer periphery of the annular wall $1c$ thereof is allowed to rotate relative to the disklike portion $2a$ of the rotor 2 in the presence of the viscous fluid 3. For this reason, the housing 1 is damped during its rotation.

In any of the embodiments described above, the viscous fluid 3 is introduced into the chamber $1a$ of the housing 1. However, particles may be used instead, either alone or in combination with a viscous fluid. Optionally, the rotor and/or the housing may be formed of oleoresin to obtain a given damping force owing to its viscosity.

As has been described in the foregoing, the rotary damper according to this invention is constructed such that a rotor which rotates while being braked is accommodated in a housing provided on the outer periphery of the annular wall thereof with a gear portion, sealed by a sealing member and closed by a cap. Since the housing can serve concurrently as a gear, the rotary damper can be made thin as a whole. Furthermore, since the rotor can be directly fixed to a device, the rotary damper can be made compact as a whole. Moreover, the thin and compact rotary damper can provide a desired braking force comparable to that of the conventional rotary dampers.

What is claimed is:

1. A rotary damper comprising:

a rotor having a shaft provided with a fixing member fixing said shaft to a stationary member;

a housing having an opening and an annular wall which is provided on an outermost peripheral portion thereof with a gear portion and forming therein a chamber accommodating said rotor so that said shaft of said rotor has a center disposed at a lengthwise center portion of said housing and so that said housing is rotatable about said rotor;

a viscous fluid accommodated in said chamber, said fluid braking rotation of said housing; and a cap fixed to the housing and rotatable therewith, said cap being positioned radially within said annular wall of said housing and sealing the viscous fluid and rotor in the housing wherein said gear portion of said housing is located radially outwardly of said cap; and wherein said shaft of said rotor projects out of said cap.

2. A rotary damper according to claim 1, wherein said rotor and said housing are made of oleoresin.

3. A rotary damper according to claim 1, wherein said shaft of said rotor is formed to have a non-circular cross section and has a screw hole, said rotor being fixed to a device by inserting said shaft into a complementary hole formed in the device and driving a screw into said screw hole of said shaft.

4. A rotary damper according to claim 1, wherein said shaft of said rotor is formed with a non-circular fitting hole, said rotor being fixed to a device by fitting a complementary boss of the device into said non-circular fitting hole of said shaft.

5. A rotary damper according to claim 1, wherein said shaft of said rotor is formed to have a non-circular cross section and is inserted into a complementary hole formed in a fitting plate of a device so that part of said shaft projects from the complementary hole, the projecting part of said shaft being fused and bonded to the fitting plate.

6. A rotary damper according to claim 1, wherein said shaft of said rotor is formed to have a non-circular cross section and is inserted into a complementary hole formed in a fitting plate of a device so that part of said shaft projects from the complementary hole, the projecting part of said shaft being caulked with said fitting plate.

7. A rotary damper comprising:

a housing having a top and bottom, said housing including an annular wall and a chamber located between the top and the bottom;

a shaft attached at a first end to a stationary object, and a second end of said shaft extending through the top of the housing and into said chamber;

a rotor attached to said second end of the shaft and positioned within the chamber, said rotor having a portion freely engaged with the bottom of the housing, said rotor supporting the housing and increasing the compactness of the rotary damper;

a viscous fluid deposited in the chamber between the rotor and the bottom of the housing in an area where the rotor is not engaged with said housing;

a cap positioned radially within said annular wall of said housing, said cap being fixed to the bottom of the housing and rotatable therewith, said cap sealing the rotor and viscous fluid within the housing and said shaft projecting out through the housing; and a gear formed on an outermost exterior perimeter of the housing to increase the compactness of the rotary damper wherein the gear pivots about the shaft causing the viscous fluid to flow past the rotor within the chamber in the area where the rotor does not engage the bottom of the housing, said viscous fluid creating a shearing force against the rotor and dampening movement of the gear about the shaft.

8. The rotary damper of claim 7, further comprising:

a bored opening in the shaft for receiving a screw; and a screw screwably mounted in said bored opening having a screw head, said screw holding said rotary damper to an external stationary object by fastening a portion of said stationary object between said screw head and said cap when the screw is screwed into the bored opening.

9. The rotary damper of claim 7, further comprising:

a fitting hole receiving a protuberance of a stationary object for frictionally holding the rotary damper to the stationary object when the protuberance is inserted into the fitting hole.

10. The rotary damper of claim 7, further comprising:

a bulged portion of the shaft having an anchor-shape for holding the rotary damper to a stationary object when the shaft is extended through an opening in the stationary object and said bulged portion is anchored on an opposite side to the housing of said rotary damper.

11. A rotary damper comprising:

a rotor having a shaft provided with a fixing member fixing said shaft to a stationary member;

a housing having an opening, an annular wall which is provided on an outer periphery thereof with a gear portion and forming therein a chamber accommodating said rotor so that said shaft of said rotor has a center disposed at a lengthwise center of said housing so that said housing is rotatable about said rotor, a viscous fluid accommodated in said chamber for braking rotation of said housing, a cap located radially within said annular wall of said housing; said cap closing said opening of said housing and being fixedly attached thereto, and a seal positioned between said cap and said viscous fluid, said seal sealing said viscous fluid within said housing, said cap and seal being rotatable with said housing wherein, said shaft of said rotor projects out of said housing and wherein said gear portion is located radially outwardly of said cap and at an outermost peripheral portion of the housing.

12. The rotary damper of claim 11, further comprising:

a bored opening in the shaft for receiving a screw; and a screw screwably mounted in said bored opening having a screw head, said screw holding said rotary damper to an external stationary object by fastening a portion of said stationary object between said screw head and said cap when the screw is screwed into the bored opening.

13. The rotary damper of claim 11, further comprising:

a fitting hole receiving a protuberance of a stationary object for frictionally holding the rotary damper to the stationary object when the protuberance is inserted into the fitting hole.

14. The rotary damper of claim 11, further comprising:

a bulged portion of the shaft having an anchor-shape for holding the rotary damper to a stationary object when the shaft is extended through an opening in the stationary object and said bulged portion is anchored on an opposite side to the housing of said rotary damper.

* * * * *